United States Patent
John

(10) Patent No.: US 9,586,548 B2
(45) Date of Patent: Mar. 7, 2017

(54) METHOD AND CONTROL UNIT FOR DETECTING AN IMPACT OF A COLLISION OBJECT ON A VEHICLE

(71) Applicant: Robert Bosch GmbH, Stuttgart (DE)

(72) Inventor: Dirk John, Korntal-Muenchingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 26 days.

(21) Appl. No.: 14/408,867

(22) PCT Filed: May 22, 2013

(86) PCT No.: PCT/EP2013/060515
§ 371 (c)(1),
(2) Date: Dec. 17, 2014

(87) PCT Pub. No.: WO2013/189683
PCT Pub. Date: Dec. 27, 2013

(65) Prior Publication Data
US 2015/0321634 A1    Nov. 12, 2015

(30) Foreign Application Priority Data
Jun. 18, 2012 (DE) .......................... 10 2012 210 233

(51) Int. Cl.
*B60R 22/00* (2006.01)
*B60R 21/26* (2011.01)
*B60R 21/0136* (2006.01)
*B60R 21/34* (2011.01)

(52) U.S. Cl.
CPC .......... *B60R 21/0136* (2013.01); *B60R 21/34* (2013.01)

(58) Field of Classification Search
USPC ............................................. 701/45; 280/736
See application file for complete search history.

(56) References Cited

U.S. PATENT DOCUMENTS

| 4,311,165 A * | 1/1982 | Rose, Jr. ............ B65H 75/4428 137/355.12 |
| 6,318,753 B1 * | 11/2001 | Valkenburg ........... B60R 21/232 280/730.2 |
| 2002/0041090 A1 * | 4/2002 | Wohllebe ............ B60R 21/2155 280/736 |
| 2012/0271509 A1 * | 10/2012 | Nehls .................. B60R 21/0136 701/34.4 |

FOREIGN PATENT DOCUMENTS

DE     102011102742 A1 *  11/2012 ......... B60R 21/0136

* cited by examiner

*Primary Examiner* — Thomas G Black
*Assistant Examiner* — Tyler Paige
(74) *Attorney, Agent, or Firm* — Norton Rose Fulbright US LLP

(57) ABSTRACT

A method for detecting an impact of a collision object on a vehicle, which has a pressure hose sensor, includes the task of importing a pressure hose sensor signal, which represents a change in a pressure of a pressurized hose of the pressure hose sensor. This method also includes activating an occupant protection system using the pressure hose sensor signal.

8 Claims, 1 Drawing Sheet

METHOD AND CONTROL UNIT FOR DETECTING AN IMPACT OF A COLLISION OBJECT ON A VEHICLE

FIELD OF THE INVENTION

The present invention relates to a method for detecting an impact of a collision object on a vehicle and also to a corresponding control unit as well as a corresponding computer program product.

BACKGROUND INFORMATION

In a frontal crash, a passive safety restraint arrangement, such as airbags and/or seat belt tighteners, for example, must be triggered as soon as possible. The decision to trigger is made by using an impact sensor system, so that the decision to trigger may be made on the basis of acceleration signals as one signal of an impact sensor system. Problems have been encountered repeatedly in this regard since the acceleration signals, which are input via the chassis in the event of a misuse, for example, an incorrect triggering caused by a section of rough road, for example, or running over a curb, are at first almost identical to those which occur in the event of a crash. Triggering is often desired in the period of time during which the acceleration signals of misuse and crash are almost identical.

SUMMARY OF THE INVENTION

Against this background, a method for detecting an impact of a collision object on a vehicle is presented in addition to a control unit which uses this method and finally a corresponding computer program product according to the main claims. Advantageous embodiments are derived from the respective subclaims and the following description.

In crash detection, in particular in frontal crash detection (i.e., detection of a frontal impact of a collision object on the vehicle) for triggering an occupant protection system, the point in time of triggering is decisive for the effectiveness of the occupant protection system. The impact sensor system used need not be situated in the foremost area of the vehicle, so as not to be destroyed directly on impact and still be able to ascertain the severity and/or type of impact during the impact and be able to supply a corresponding trigger signal. The signal of the impact sensor system in an actual impact differs only insignificantly from specific road situations, such as running over a curb, for example, at least at the beginning. The latter is also referred to with the English term "misuse," such a misuse being a situation in which a sensor supplies at least one signal, which may provide a hint about a hazardous situation, although it may not actually exist. The sensor signal would then have been caused by the action of physical variables in a nonhazardous driving situation.

Thus, to divide between misuse and a fiery crash on the basis of the signals of the acceleration sensors at the required or desired triggering point in time is very unrobust, i.e., difficult or even impossible to differentiate. In connection with pedestrian protection systems, a pressure hose sensor is situated in the area of the front bumper of motor vehicles in some cases. A pressure hose sensor is not able to transmit any signals in the case of an event input strictly via the chassis. Due to the exposed configuration of the pressure hose sensor, it may output a corresponding signal immediately in the event of a frontal impact of the vehicle on an object. In a frontal impact, the pressure hose sensor signal permits early triggering of the occupant protection system while avoiding misuse in triggering of the occupant protection system due to a signal curve of the impact sensor system which is not reliably assignable.

The present invention creates a method for detecting an impact of a collision object on a vehicle, the vehicle having a pressure hose sensor, the vehicle also having an impact sensor system for detecting an impact of a collision object on the vehicle, the method including the following:

importing a pressure hose sensor signal, which represents a change in a pressure in a pressurized pressure hose of the pressure hose sensor;

activating an occupant protection system using the pressure hose sensor signal and a signal of the impact sensor system.

The vehicle may be a motor vehicle, for example, a passenger vehicle, a truck or some other commercial vehicle. The vehicle may be equipped with a system for frontal crash detection or for frontal impact detection. A frontal crash detection or a frontal impact detection may be understood to refer to a collision and/or an impact of the front of the vehicle with a collision object. The collision object may be a vehicle or a pedestrian, a tree or any other movable body, a fixed body or a stationary body. The system presented here need not necessarily be used for detection of a frontal impact; instead it may also be used for detection of a side impact of an object on the vehicle, for example, when the pressure hose is installed in the respective side of the vehicle by which an impact of an object on the vehicle is to be detected. A collision may be detected by using an impact sensor system.

The impact sensor system may include at least one acceleration sensor and, alternatively or simultaneously, a structure-borne sound sensor or another sensor for detecting a physical variable for detection of an impact of an object on the vehicle. The impact sensor system may output a signal representing a signal of the impact sensor system. The vehicle may have a pressure hose sensor. The pressure hose sensor may be situated in the front bumper of the vehicle. The pressure hose sensor may have at least one pressure hose (which may be under pressure) and/or one pressure sensor. The pressure hose may be sealed hermetically with respect to the surroundings. A pressure may build up in the pressure hose under deformation.

In the resting state, the pressure in the pressure hose sensor may correspond to the ambient pressure. A pressure hose sensor signal may be understood in general to be a signal of a pressure hose sensor, which represents a change in a pressure in the pressure hose of the pressure hose sensor. The vehicle may have an occupant protection system, for example. The occupant protection system may also be configured as an occupant restraint system or as a person restraint system or as a person protection system. The occupant protection system may be a restraint system, which may include an airbag, a side airbag and/or a seat belt tightener, for example. The triggering logic for the occupant protection system may be implemented in a control unit.

Furthermore, according to one specific embodiment, at least one triggering threshold of an algorithm for activating the occupant protection system may be altered as a function of the pressure hose sensor signal in the triggering step. The triggering threshold of the algorithm may be understood here to be a threshold value for adjusting the robustness, i.e., the ability of the method not to cause accidental triggering of the occupant protection system or to respond according to the sensor signals of the pressure hose sensor and/or of the impact sensor system, these sensor signals being present and, at the same time or alternatively, the sensor signals of the pressure hose sensor which are not present. Thus when the pressure hose sensor signal does not report any change in the pressure in the pressure hose sensor (i.e., no deformation of the vehicle, in particular in the front area, is to be assumed), an algorithm having a higher robustness, i.e., a higher triggering threshold value, is used than when the pressure hose sensor signal sends a message due to a change in the pressure in the pressure hose sensor and thus an assumed deformation of the front of the vehicle.

Alternatively or simultaneously, a signal of the impact sensor system may be adapted as a function of the pressure hose sensor signal. Adaptation of a signal of the impact sensor system may also influence the robustness of the algorithm or of the system as a whole. An actual impact may be detected advantageously even in the event of a defective pressure hose. In this case, the occupant protection system may then be triggered on the basis of one signal or multiple signals of the triggering unit when the pressure hose sensor signal has no (valid) signal value or has a signal value indicating failure of the pressure hose sensor. In the case of a defective pressure hose, the occupant protection system may be triggered at a later point in time than if the pressure hose sensor were functioning correctly.

According to one specific embodiment of the present invention, the information of the pressure hose sensor may be used in the pressure hose sensor signal to alter the robustness of an algorithm. In other words, when the pressure hose sensor does not report any deformation of the vehicle, an algorithm having a greater robustness is used than when the pressure hose sensor reports a deformation of the front of the vehicle. True impact situations or crashes may advantageously also trigger in the case when the pressure hose sensor is defective. This triggering may occur later due to the more robust thresholds for the signal of the impact sensor system, but the strong accelerations in a real crash may also exceed the more robust thresholds. In one particular specific embodiment, the information of the pressure hose sensor may act as an add-on to an algorithm for the decision to trigger the occupant protection system. Special impact situations, such as a truck underride, in which the front of the vehicle might not be deformed, may also advantageously result in triggering of the occupant protection system. Triggering may occur even when a defect is not detected in the pressure hose sensor.

According to one specific embodiment of the present invention, a signal of the impact sensor system may be validated with the aid of the pressure hose sensor signal. Alternatively or additionally, the pressure hose sensor signal may be validated in the step of activating with the aid of a signal of the impact sensor system. The pressure hose sensor signal and the signal of the impact sensor system may carry out a mutual plausibility check. For example, a strong acceleration signal of the impact sensor system may be regarded as implausible in the absence of a signal from the pressure hose sensor.

In a favorable specific embodiment, the pressure hose sensor and the impact sensor system or the acceleration sensors may also carry out a mutual plausibility check, i.e., may mutually detect a maloperation. If necessary, signals from the pressure hose sensor may be regarded as implausible in the event of an absence of acceleration signals or even excessive acceleration signals in the absence of signals from the pressure hose sensor.

According to another specific embodiment of the present invention, a pressure hose sensor signal, which is output by a pressure hose sensor which is installed in the front area of the vehicle, may be imported in the import step. Such a specific embodiment of the present invention offers the advantage of particularly reliable detection of a frontal impact of a collision object on the vehicle. Detection of a frontal impact in particular is subject to the release of high energies, so that activating the person protection arrangement for the frontal impact may be ensured particularly reliably by such a specific embodiment of the present invention.

In one specific embodiment, the occupant protection system may be triggered by a trigger signal of the pressure hose sensor. The occupant protection system may be triggered directly by a signal of the pressure hose sensor. A very early point in time of triggering may be achieved in this way.

According to another specific embodiment of the present invention, a pressure hose sensor signal, which is part of a pedestrian protection system of the vehicle, may be imported in the import step. A pedestrian protection system may be understood to be, for example, a system for opening the engine hood in the event of a collision between the vehicle and the pedestrian. In modern vehicles, such pedestrian protection systems are often already the standard, so that through further use of a pressure hose sensor, which is already part of a pedestrian protection system, an additional benefit may be obtained by simple linkage of signals of sensors already installed in the vehicle in such a specific embodiment of the present invention.

According to one specific embodiment of the present invention, the greatest inclusion of the pressure hose sensor signal in the decision to trigger may be suppression of any front restraint arrangement in the case when no signal has been sent by the pressure hose sensor. Such a specific embodiment of the present invention advantageously ensures that triggering does not occur in all instances of misuse transmitted via the chassis.

It is also favorable if, after importing a pressure hose sensor signal, which represents a change in the pressure in the pressure hose of the pressure hose sensor, the occupant protection system is also triggered in response to a signal of the impact sensor system in the subsequent absence of the pressure hose sensor signal. A failure of the pressure hose sensor may generate a trigger signal for the occupant protection system in conjunction with a characteristic signal of the impact sensor system. If the pressure hose sensor fails immediately after a strong signal, the failure of the pressure hose sensor may be caused by destruction in an impact or crash. If strong accelerations are recorded by the impact sensor system shortly after the failure of the pressure hose sensor, this may be due to an impact or crash.

Depending on the behavior of the pressure hose sensor, a failure of the sensor after a previous pressure signal or an acceleration signal following soon after a failure may be used as an indicator of a reduction in robustness of the algorithm. If the pressure hose sensor indicates a (strong) useful signal and fails immediately thereafter, it is probable that the failure is due to destruction of the sensor in a crash. This is also true if the sensor fails and strong accelerations are measured in the vehicle shortly thereafter.

The present invention also creates a control unit configured to carry out or implement the steps of the method according to the present invention in corresponding equipment. The object on which the present invention is based may also be achieved rapidly and efficiently through this embodiment variant of the present invention in the form of a control unit.

A control unit in the present case may be understood to be an electrical device, which processes at least one sensor signal and outputs control and/or data signals as a function thereof. The control unit may have an interface, which may be implemented in hardware and/or software. In the case of a hardware approach, the interfaces may be part of a so-called system ASIC, for example, which includes a wide variety of functions of the control unit. However, it is also possible for the interfaces to be separate integrated circuits or to be made up of discrete components, at least partially. In a software approach the interfaces may be software modules which are present in a microcontroller, for example, in addition to other software modules.

Also advantageous is a computer program product having program code, which may be stored on a machine-readable carrier, such as a semiconductor memory, a hard drive memory or an optical memory, and is used to carry out the method according to one of the specific embodiments described above when the program product is carried out on a computer, a device or a control unit.

The present invention is described in greater detail below on the basis of the accompanying drawings.

DETAILED DESCRIPTION

Figure 1:
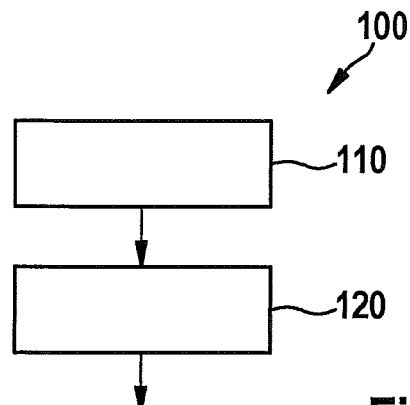
FIG. 1 shows a flow chart of a method according to one exemplary embodiment of the present invention.

In the following description of exemplary embodiments of the present invention, the same or similar reference numerals are used for the elements having similar effects, as illustrated in the various figures, a repeated description of these elements being dispensed with.

FIG. 1 shows a flow chart of a method 100 according to one exemplary embodiment of the present invention. A step 110 of importing a pressure hose sensor signal is followed by a step 120 of triggering an occupant protection system. In step 110 of importing a pressure hose sensor signal, a signal which represents a change in a pressure in a pressurized pressure hose of the pressure hose sensor is imported. In triggering step 120, the occupant protection system is triggered using the pressure hose sensor signal.

The method presented here discriminates whether the acceleration signals originate from a crash or impact or were input via the chassis. Therefore, an early separation between misuses and fiery crashes and thus an early more robust triggering of an occupant protection system or restraint arrangement are possible. To achieve the discrimination, signals of a pressure hose sensor used as a sensor for pedestrian protection are used.

According to the approach presented here, a pressure hose sensor supplies signals only when the front of the vehicle has in fact been deformed. A front impact or crash may have occurred only when the front of the vehicle is deformed. If the front of the vehicle is not deformed, measured acceleration signals must have been transmitted via the chassis. In this case, it must be misuse and triggering may be suppressed or is suppressed. Early triggering of the restraint arrangement in frontal crashes is achieved by the method presented here.

Figure 2:
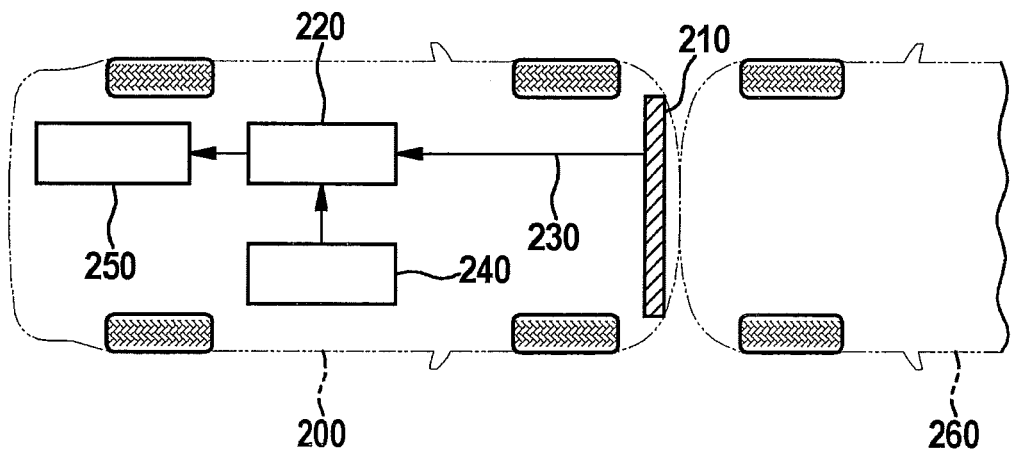
FIG. 2 shows a schematic diagram of a control unit for frontal crash detection in a vehicle according to one exemplary embodiment of the present invention.

Method 100 illustrated in FIG. 1 may be carried out in a control unit in a vehicle. FIG. 2 shows a corresponding exemplary embodiment.

FIG. 2 shows a schematic diagram of a control unit for frontal crash detection in a vehicle according to one exemplary embodiment of the present invention. In a vehicle 200, a pressure hose sensor 210 for frontal crash detection is situated in the front area of vehicle 200. To detect a side impact, however, the pressure hose may also be situated on an exterior side of the vehicle pointing from the center of the vehicle into a direction other than the direction of travel. Pressure hose sensor 210 is connected to a control unit 220 for frontal crash detection. Pressure hose sensor 210 is configured to transmit a pressure hose sensor signal 230 to control unit 220 for frontal crash detection. Control unit 220 is also connected to an impact sensor system 240 and an occupant protection system 250. A collision object 260, which collides with a front area of vehicle 200, in which the pressure hose sensor is installed, in a frontal impact is situated in front of vehicle 200 in the direction of travel. Control unit 220 for frontal crash detection has devices such as, for example, an interface (not shown) for importing the pressure sensor signal and a unit for activating the occupant protection system to carry out one exemplary embodiment of a method 100 for frontal crash detection for a vehicle 200 shown in FIG. 1.

A pressure hose sensor system 210 for frontal crash detection is used in vehicle 200 shown in FIG. 2 and an occupant protection system 250 is triggered, such as an airbag.

The exemplary embodiments described here and illustrated in the figures are selected only as examples. Various exemplary embodiments may be combined with one another completely or with respect to individual features. One exemplary embodiment may also be supplemented by features of another exemplary embodiment.

Furthermore, the method steps according to the present invention may be carried out repeatedly and in a different sequence than that described here.

If one exemplary embodiment includes an "and/or" link between a first feature and a second feature, this is to be interpreted as meaning that the exemplary embodiment according to one specific embodiment includes both the first feature and the second feature and according to another specific embodiment includes either only the first feature or only the second feature.

What is claimed is:

1. A method for detecting an impact of a collision object on a vehicle, the method comprising:
   importing a pressure hose sensor signal which represents a change in a pressure in a pressurized pressure hose of a pressure hose sensor, wherein the vehicle has the pressure hose sensor and also has an impact sensor system for detecting an impact of a collision object on the vehicle; and
   activating an occupant protection system using the pressure hose sensor signal and a signal of the impact sensor system, wherein at least one triggering threshold of an algorithm for the activating of the occupant protection system is altered as a function of the pressure hose sensor signal.

2. The method of claim 1, wherein in the activating, a signal of the impact sensor system is validated with the aid of a pressure hose sensor signal, and/or in the activating, the pressure hose sensor signal is validated with the aid of a signal of the impact sensor system.

3. The method of claim 1, wherein the imported pressure hose sensor signal includes a signal that is output by a pressure hose sensor which is installed in the front area of the vehicle.

4. The method of claim 1, wherein the imported pressure hose sensor signal includes a signal that is part of a pedestrian protection system of the vehicle.

5. The method of claim 1, wherein after importing the pressure hose sensor signal, the occupant protection system is also activated even in a case of a subsequent failure of the pressure hose sensor to output the pressure hose sensor signal, in response to a signal of the impact sensor system.

6. The method according to claim 1, wherein the impact sensor system includes at least one acceleration sensor, the method further comprises comparing at least one acceleration signal from the at least one acceleration sensor to the altered at least one triggering threshold, and the activating is based on a result of the comparison.

7. A control unit for detecting an impact of a collision object on a vehicle, comprising:
   an importing arrangement to import a pressure hose sensor signal which represents a change in a pressure in a pressurized pressure hose of a pressure hose sensor, wherein the vehicle has the pressure hose sensor and also has an impact sensor system for detecting an impact of a collision object on the vehicle; and
   an activating arrangement to activate an occupant protection system using the pressure hose sensor signal and a signal of the impact sensor system, wherein at least one triggering threshold of an algorithm for the activation of the occupant protection system is altered as a function of the pressure hose sensor signal.

8. A non-transitory computer readable medium having a computer program, comprising:
   program code that is executable by a processor, and that, when executed by the processor, causes the processor to perform a method for detecting an impact of a collision object on a vehicle, by performing the following:
      importing a pressure hose sensor signal which represents a change in a pressure in a pressurized pressure hose of a pressure hose sensor, wherein the vehicle has the pressure hose sensor and also has an impact sensor system for detecting an impact of a collision object on the vehicle; and
      activating an occupant protection system using the pressure hose sensor signal and a signal of the impact sensor system, wherein at least one triggering threshold of an algorithm for the activating of the occupant protection system is altered as a function of the pressure hose sensor signal.

* * * * *